Patented Aug. 17, 1926.

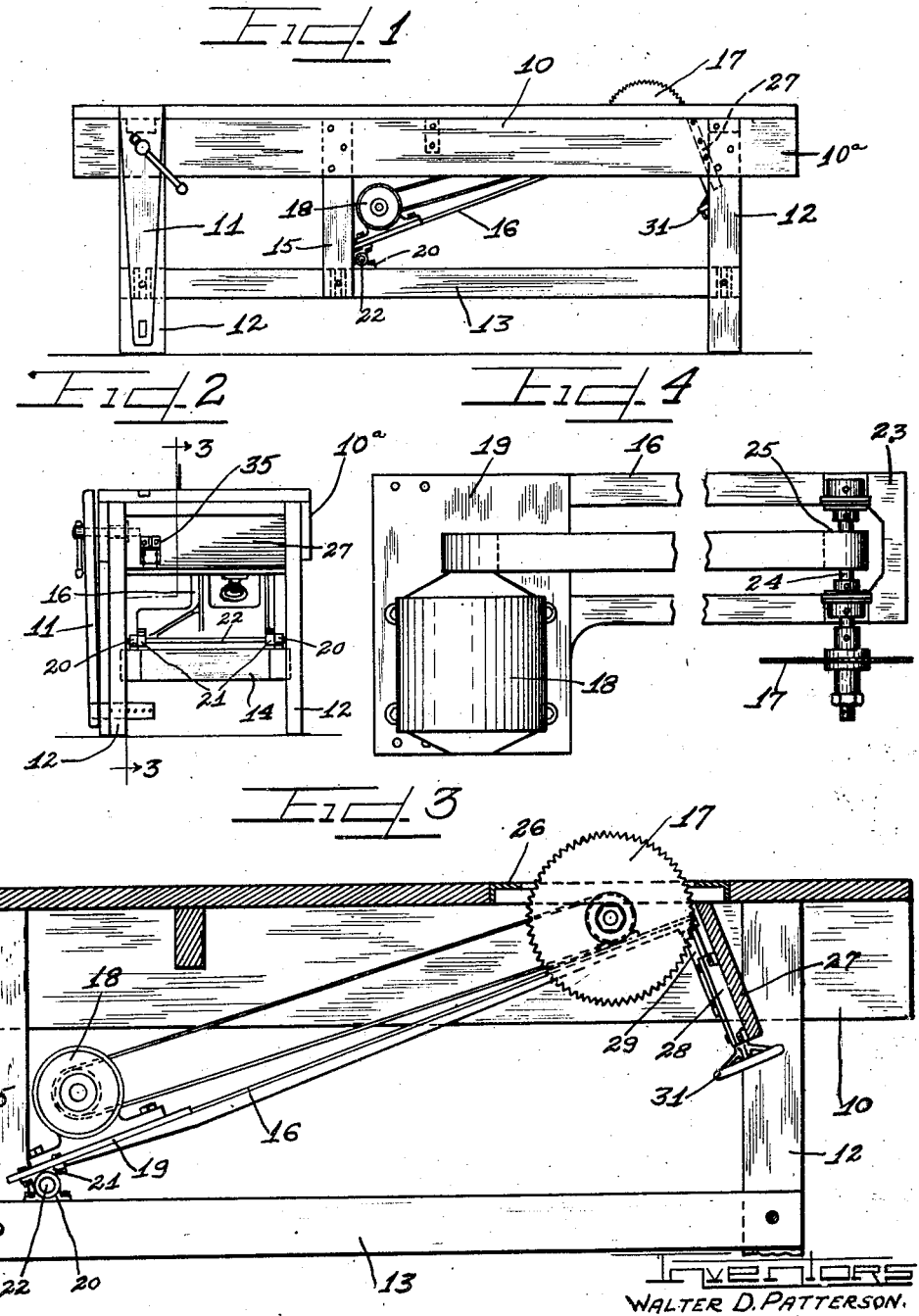

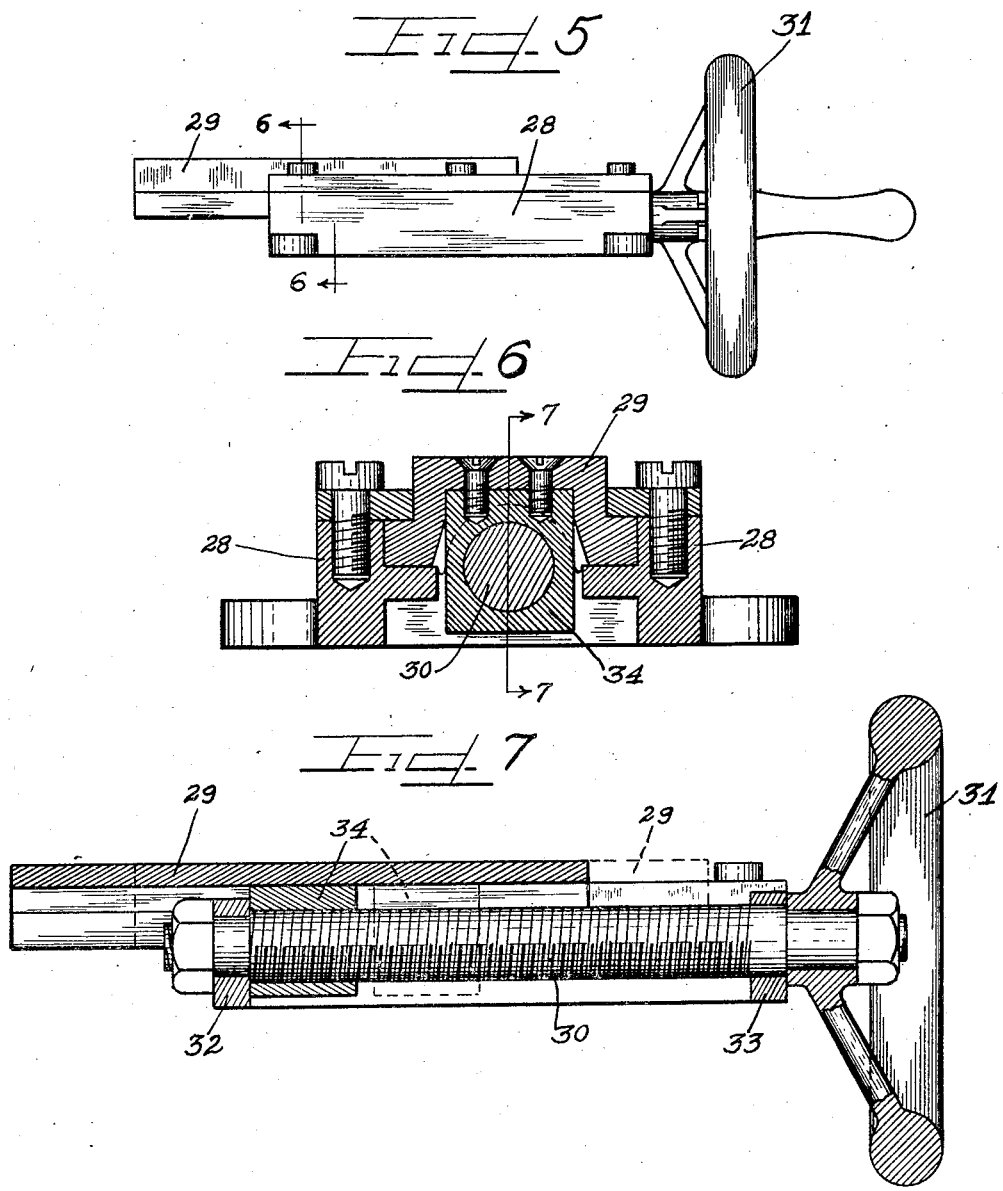

1,596,116

UNITED STATES PATENT OFFICE.

WALTER D. PATTERSON, OF CEDAR RAPIDS, AND WILLIAM E. FLEMING, OF KENWOOD PARK, IOWA.

SAW BENCH.

Application filed March 31, 1923. Serial No. 629,210.

The present invention relates to a work bench, and has particularly to do with the disposition of a rotary saw thereon.

The primary object of the invention is to provide convenient rotary saw facilities upon a work bench; secondarily, the object of the invention is to provide a swingable saw mounting of unique character; and additionally, other objects of the invention are the provision of an improved saw and motor bracket, of a novel pivoted mounting for such saw and motor bracket, and a novel efficient means for elevating and lowering the working position of the saw.

These, and such other objects as may hereinafter appear, are obtained by the novel construction, combination and arrangement of the parts of our device which is illustrated in the accompanying two sheets of drawings in which:

Fig. 1 is an elevation of a work bench illustrating our improved saw mechanism:

Fig. 2 is an end elevation of said bench;

Fig. 3 is a vertical section along the line 3—3 of Fig. 2;

Fig. 4 is a view of the saw bracket and arbor, the intermiddle portion thereof being broken away, and Figs. 5, 6 and 7 disclose the bracket elevating and lowering mechanism, Fig. 5 showing the exterior portion thereof, Fig. 6 a transverse section along the line 6—6 of Fig. 5, and Fig. 7 a longitudinal section along the line 7—7 of Fig. 6.

Like reference characters are used to designate similar parts in the drawings and in the description which follows.

Referring first to Figs. 1, 2 and 3, the ordinal 10 designates a work bench, having aprons 10ª, and provided with a vise 11. The usual legs 12, and the conventional longitudinal braces 13 and transverse braces designated 14 therebetween are disclosed. Depending vertical braces 15 are placed nearer one end of the table 10 than the other. Ordinary tie-bolts for securing the legs and braces of the table structure are employed.

A swinging bracket 16 is provided both for the saw 17 and for the motor 18, which latter drives said saw by belt. Said bracket, at its lower end, comprises a motor pad 19, and is pivotally mounted upon the table 10 by rocker bearings which rocker bearings comprise outer members 20 secured to the transverse brace 14 intermediate the vertical braces 15, and inner bearing members 21 secured upon the under side of the bracket 16. An axle 22 passes transversely from one side to the other of said table 10 and through said bearing members 20 and 21.

The upper portion of the bracket 16 comprises two parallel arms or members joined by a cross tie or member, or end piece, 23, at their outer extremity. Such end portion 23, in conjunction with the parallel arms referred to, forms an arbor for the saw 17. Bearings or journals are provided upon the parallel members of the bracket 16, and an axle or shaft 24, disposed therein, is supplied with proper mountings for securing saw 17 near one extremity thereof. A pulley 25, intermediate said bearings is driven by a belt from the motor 18.

The top of the table 10 is slotted, as is best indicated in Fig. 3, to admit of the passage of the blade of saw 17 therethrough, and such slots may be surrounded and protected by a metallic frame-work 26 as illustrated in said figure.

As the saw bracket 16 is swingably mounted, means should be provided for lowering and for elevating the free end of such bracket. A transverse member or sleeper 27 is secured intermediate the aprons 10ª of the table 10. This sleeper is disposed at an incline substantially parallel to an imaginary line which would be drawn between the extremities of an arc describing the movement of the free end of bracket 16 while the saw 17 remains in operative position on work bench 10.

Referring now to Figs. 3, 5, 6 and 7, it will be noted that the elevating mechanism is disposed upon the sleeper 27 and comprises a saddle 28, well secured to said sleeper by bolts or other suitable fastening means. Said saddle 28 provides a track or sliding bearing for the vertical movement of a carriage 29 upwardly and downwardly. The upper extremity of said carriage 29 engages the under surface of the cross member or end piece 23 and determines the elevation of the bracket 16 and the position of the saw 17 with respect to the top of table 10.

Elevating or lowering of the carriage 29 is accomplished by the rotation of a feed screw 30 supplied with a hand-wheel 31 for ready and rapid manipulation. Said feed screw 30 is secured against axial displacement by bearings 32 and 33 at the ends of saddle 28, the former, 32, being of a diameter less than the feed screw 30. The hand-wheel 31 is secured to the feed screw 30 and the latter within the saddle 28 by nuts disposed at the ends of said feed screw 30 beyond bearings 32 and 33.

A feed nut 34, of a generally rectangular configuration, moves upwardly or downwardly upon feed screw 30 with the rotation of the latter by hand-wheel 31. Said feed nut 34 is secured, in turn, to the carriage 29 by machine screws or other suitable fastening means passing from the latter to the former. The relative position of the carriage 29 to the saddle 28 thus is determined by the situating of the feed nut 34 upon the feed screw 30, and such position is altered or modified by rotation of said hand-wheel 31 either to the right or to the left as it is desired to raise or to lower the bracket 16 which engages said carriage 29.

A switch for controlling the motor 18 is disposed at one end of the table and is designated by the numeral 35. Suitable wiring from said switch to the motor is, of course, provided.

It is manifest that the particular or specific form of the invention illustrated may be modified without departing from the spirit of the invention, and also, that it is impossible to illustrate all of the forms which such modifications might take, hence we do not want to be limited to the specific type of our invention disclosed in the drawings but claim as our invention the subject matter of the claim hereto appended.

We claim:

The combination with a bench having a transverse brace member and a bench top with a slit therein of a saw member pivoted on a member secured to said transverse brace member, said saw member comprising a frame, a motor secured to the lower end of said frame, a saw secured to the upper end and projecting through said slit, a brace member secured to said bench top, a screw positioned in said brace member and having its upper end engaging the saw member frame, and means for turning said screw for controlling the projection of said saw through said slit.

WALTER D. PATTERSON.
WILLIAM E. FLEMING.